INVENTORS
ERNEST L. HILLMAN &
ROBERT H.G. CHAN
BY Carl V. Olson
Attorney

INVENTORS
ERNEST L. HILLMAN &
ROBERT H. G. CHAN
BY
Carl V. Olson
Attorney

| | | SUB-SCANS | | | | | | | | | | | | | | | |
|---|---|---|---|---|---|---|---|---|---|---|---|---|---|---|---|---|---|
| B | SEQ | 1 | 2 | 3 | 4 | 5 | 6 | 7 | 8 | 9 | 10 | 11 | 12 | 13 | 14 | 15 | 16 |
| 75 | 1 | 001 | 002 | 003 | 004 | 005 | 006 | 007 | 008 | 009 | 010 | 011 | 012 | 013 | 014 | 015 | 016 |
| | 2 | 033 | 034 | 035 | 036 | 037 | 038 | 039 | 040 | 041 | 042 | 043 | 044 | 045 | 046 | 047 | 048 |
| | 3 | 065 | 066 | 067 | 068 | 069 | 070 | 071 | 072 | 073 | 074 | 075 | 076 | 077 | 078 | 079 | 080 |
| | 4 | 097 | 098 | 099 | 100 | 101 | 102 | 103 | 104 | 105 | 106 | 107 | 108 | 109 | 110 | 111 | 112 |
| | 5 | 130 | 131 | 132 | 133 | 134 | 135 | 136 | 137 | 138 | 139 | 140 | 141 | 142 | 143 | 144 | 145 |
| | 6 | 161 | 162 | 164 | 165 | 166 | 167 | 168 | 169 | 170 | 171 | 172 | 173 | 174 | 175 | 176 | 177 |
| 150 | 7 | 178 | 179 | 180 | 181 | 182 | 183 | 184 | 185 | 186 | 187 | 188 | 189 | 190 | 191 | 192 | 193 |
| | 8 | 194 | 213 | 195 | 213 | 196 | 213 | 197 | 213 | 198 | 213 | 199 | 213 | 200 | 213 | 201 | 213 |
| 1200 | 9 | 202 | 214 | 202 | | 202 | | 202 | | 202 | | 202 | | 202 | | 202 | |
| | 10 | 203 | 215 | | | | | | | | | | | | | | |
| | 11 | 204 | 216 | | | | | | | | | | | | | | |
| | 12 | 205 | 217 | | | | | | | | | | | | | | |
| | 13 | 206 | 218 | | | | | | | | | | | | | | |
| | 14 | 207 | 219 | | | | | | | | | | | | | | |
| | 15 | 208 | 220 | | | | | | | | | | | | | | |
| | 16 | 209 | 221 | | | | | | | | | | | | | | |
| | 17 | 210 | 222 | | | | | | | | | | | | | | |
| | 18 | 211 | 223 | ↓ | | ↓ | | ↓ | | ↓ | | ↓ | | ↓ | | ↓ | |
| | 19 | 212 | 224 | 212 | | 212 | | 212 | | 212 | | 212 | | 212 | | 212 | |
| 2400 | 20 | 225 | 225 | 225 | | 225 | | 225 | | 225 | | 225 | | 225 | | 225 | |
| | 21 | 226 | 226 | | | | | | | | | | | | | | |
| | 22 | 227 | 227 | | | | | | | | | | | | | | |
| | 23 | 228 | 228 | | | | | | | | | | | | | | |
| | 24 | 229 | 229 | | | | | | | | | | | | | | |
| | 25 | 230 | 230 | | | | | | | | | | | | | | |
| | 26 | 231 | 231 | | | | | | | | | | | | | | |
| | 27 | 232 | 232 | | | | | | | | | | | | | | |
| | 28 | 233 | 233 | | | | | | | | | | | | | | |
| | 29 | 234 | 234 | | | | | | | | | | | | | | |
| | 30 | 235 | 235 | | | | | | | | | | | | | | |
| | 31 | 236 | 236 | | | | | | | | | | | | | | |
| | 32 | 237 | 237 | | | | | | | | | | | | | | |
| | 33 | 238 | 238 | | | | | | | | | | | | | | |
| | 34 | 239 | 239 | | | | | | | | | | | | | | |
| | 35 | 240 | 240 | | | | | | | | | | | | | | |
| | 36 | 241 | 241 | | | | | | | | | | | | | | |
| | 37 | 242 | 242 | | | | | | | | | | | | | | |
| | 38 | 243 | 243 | | | | | | | | | | | | | | |
| | 39 | 244 | 244 | | | | | | | | | | | | | | |
| | 40 | 245 | 245 | | | | | | | | | | | | | | |
| | 41 | 246 | 246 | | | | | | | | | | | | | | |
| | 42 | 247 | 247 | | | | | | | | | | | | | | |
| | 43 | 248 | 248 | ↓ | ↓ | ↓ | ↓ | ↓ | ↓ | ↓ | ↓ | ↓ | ↓ | ↓ | ↓ | ↓ | ↓ |
| | 44 | 249 | 249 | 249 | 249 | 249 | 249 | 249 | 249 | 249 | 249 | 249 | 249 | 249 | 249 | 249 | 249 |
| | 45 | 000 | 000 | 000 | 000 | 000 | 000 | 000 | 000 | 000 | 000 | 000 | 000 | 000 | 000 | 000 | 000 |

Fig. 4A.

INVENTORS
ERNEST L. HILLMAN &
BY ROBERT H. G. CHAN
Carl V. Olson
Attorney

SUB-SCANS (CONT'D)

| 17 | 18 | 19 | 20 | 21 | 22 | 23 | 24 | 25 | 26 | 27 | 28 | 29 | 30 | 31 | 32 | SEQ |
|---|---|---|---|---|---|---|---|---|---|---|---|---|---|---|---|---|
| 017 | 018 | 019 | 020 | 021 | 022 | 023 | 024 | 025 | 026 | 027 | 028 | 029 | 030 | 031 | 032 | 1 |
| 049 | 050 | 051 | 052 | 053 | 054 | 055 | 056 | 057 | 058 | 059 | 060 | 061 | 062 | 063 | 064 | 2 |
| 081 | 082 | 083 | 084 | 085 | 086 | 087 | 088 | 089 | 090 | 091 | 092 | 093 | 094 | 095 | 096 | 3 |
| 113 | 114 | 115 | 116 | 117 | 118 | 119 | 120 | 121 | 122 | 123 | 124 | 125 | 126 | 127 | 128 | 4 |
| 146 | 147 | 148 | 149 | 150 | 151 | 152 | 153 | 154 | 155 | 156 | 157 | 158 | 159 | 160 | 129 | 5 |
| 163 | X | 164 | 165 | 166 | 167 | 168 | 169 | 170 | 171 | 172 | 173 | 174 | 175 | 176 | 177 | 6 |
| 178 | 179 | 180 | 181 | 182 | 183 | 184 | 185 | 186 | 187 | 188 | 189 | 190 | 191 | 192 | 193 | 7 |
| 194 | 213 | 195 | 213 | 196 | 213 | 197 | 213 | 198 | 213 | 199 | 213 | 200 | 213 | 201 | 213 | 8 |
| 202 | | 201 | | 201 | | 202 | | 202 | | 202 | | 202 | | 202 | | 9 |
| | | | | | | | | | | | | | | | | 10 |
| | | | | | | | | | | | | | | | | 11 |
| | | | | | | | | | | | | | | | | 12 |
| | | | | | | | | | | | | | | | | 13 |
| | | | | | | | | | | | | | | | | 14 |
| | | | | | | | | | | | | | | | | 15 |
| | | | | | | | | | | | | | | | | 16 |
| | | | | | | | | | | | | | | | | 17 |
| | | | | | | | | | | | | | | | | 18 |
| 212 | | 212 | | 212 | | 212 | | 212 | | 212 | | 212 | | 212 | | 19 |
| 225 | | 225 | | 225 | | 225 | | 225 | | 225 | | 225 | | 225 | | 20 |
| | | | | | | | | | | | | | | | | 21 |
| | | | | | | | | | | | | | | | | 22 |
| | | | | | | | | | | | | | | | | 23 |
| | | | | | | | | | | | | | | | | 24 |
| | | | | | | | | | | | | | | | | 25 |
| | | | | | | | | | | | | | | | | 26 |
| | | | | | | | | | | | | | | | | 27 |
| | | | | | | | | | | | | | | | | 28 |
| | | | | | | | | | | | | | | | | 29 |
| | | | | | | | | | | | | | | | | 30 |
| | | | | | | | | | | | | | | | | 31 |
| | | | | | | | | | | | | | | | | 32 |
| | | | | | | | | | | | | | | | | 33 |
| | | | | | | | | | | | | | | | | 34 |
| | | | | | | | | | | | | | | | | 35 |
| | | | | | | | | | | | | | | | | 36 |
| | | | | | | | | | | | | | | | | 37 |
| | | | | | | | | | | | | | | | | 38 |
| | | | | | | | | | | | | | | | | 39 |
| | | | | | | | | | | | | | | | | 40 |
| | | | | | | | | | | | | | | | | 41 |
| | | | | | | | | | | | | | | | | 42 |
| | | | | | | | | | | | | | | | | 43 |
| 249 | 249 | 249 | 249 | 249 | 249 | 249 | 249 | 249 | 249 | 249 | 249 | 249 | 249 | 249 | 249 | 44 |
| 000 | 000 | 000 | 000 | 000 | 000 | 000 | 000 | 000 | 000 | 000 | 000 | 000 | 000 | 000 | 000 | 45 |

Fig. 4B.

INVENTORS
ERNEST L. HILLMAN &
ROBERT H. G. CHAN
BY Carl V. Olson
Attorney

United States Patent Office 3,312,950

Patented Apr. 4, 1967

3,312,950

BUFFER SYSTEM WITH EACH CHANNEL TRANSFERRING TO A SPECIFIED MEMORY LOCATION, SAID LOCATION STORING INDICATION OF NEXT CHANNEL TO BE SERVICED

Ernest L. Hillman, Cherry Hill, and Robert H. G. Chan, Haddonfield, N.J., assignors to Radio Corporation of America, a corporation of Delaware Filed May 28, 1964, Ser. No. 370,830
11 Claims. (Cl. 340—172.5)

This invention relates to buffer systems for use between many real-time digital communications channels each supplying and receiving information one bit at a time and a communications processing computer equipment receiving and supplying information in units of one character at a time.

It is the common practice in digital communications systems to connect each incoming channel line to a character buffer in which the information bits arriving serially are accumulated into a character, which is then supplied to communications processing equipment. Similarly, each outgoing line is connected to a character buffer which receives a character from the communications processing equipment and supplies information bits, one bit at a time, to the outgoing line. Each of these character buffers normally includes a shift register having as many flip-flops as there are bits in a character, and other storage and control circuits. When there are many communications channels to be serviced by a communications processing computer, the correspondingly large number of character buffers are costly, occupy a large amount of space and consume a large amount of power. The disadvantages of using character buffers are particularly great when a large number of channels, such as 250, are to be serviced.

It is therefore a general object of this invention to provide an improved system wherein the many character buffers previously needed are replaced by a small, fast, inexpensive buffer computer which accumulates bits from incoming lines into incoming characters for use by communications processing computer, and which distributes outgoing characters from the communications processing computer to outgoing lines a bit at a time.

It is another object to provide a system, for buffering between bit-serial communications channels and a communications processing computer, which is adaptable without changes in hardware for efficient use in applications wherein the many communications channels include channels operating at several different transmission speeds, and wherein any proportions of the channels operate at the several different speeds.

It is a further object to provide an improved system for the indirect addressing of a large number of memory word locations in a sequence wherein different groups of word locations are addressed at different frequencies.

According to an example of the invention, each bit-serial input and output communications channel pair is connected to an individual bit buffer for receiving and storing one information bit and for storing and sending one information bit. A high speed memory is provided having as many word storage locations as there are communications channels to be serviced. Each word location has an address identifying a respective channel and the corresponding word location. During each service of one communications channel, the corresponding address is supplied as a selection signal to the bit buffer to select the corresponding bit buffer, and simultaneously the address is used to access the contents of the corresponding memory word location. An information bit is transferred from the selected bit buffer to a portion of the word location where a complete character is being accumulated, and an information bit from a character portion of the word location is transferred out to the selected bit buffer. Each channel word includes a scan control portion used for determining the address of the next channel to be serviced.

The many communications channels as identified by their addresses are divided into subscan groups. Each subscan group includes all of the highest speed channels, only one of the slowest speed channels, and an intermediate number of the intermediate speed channels. Each channel word includes a scan control portion identifying the address of the next channel to be serviced in the particular subscan. However, the last channel word of all subscans contains a scan control portion which is varied by logic circuitry to generate the address of the first channel of the next following subscan. Further, the scan control portion of one channel word in the last subscan group is unique and is utilized by logic circuitry to generate an address, following servicing of the last channel of the last subscan, for use in servicing the first channel of the first subscan. In any particular application, the sequence desired for servicing a large number of channels of differing operating speeds is readily accomplished by loading appropriate addresses into the scan control portions of the channel word locations.

In the drawings:

FIGS. 4A and 4B, taken together, constitute an illustrative chart showing the sequence in which the system of FIG. 2 can sequentially service 250 bit-serial communications channels having four different operating speeds.

DESCRIPTION OF COMMUNICATIONS SYSTEM

Figure 1:
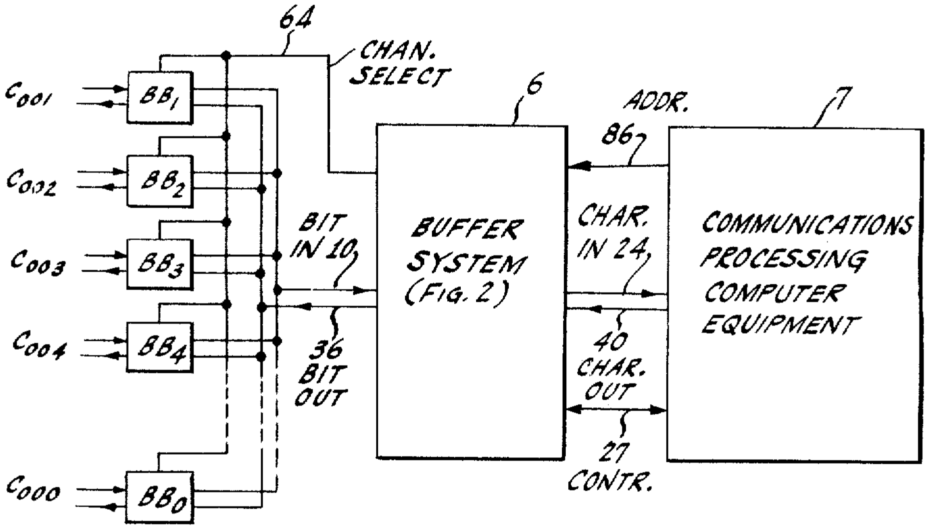
FIG. 1 is a block diagram showing the environment and functional usefulness of the buffer system of the invention.

Referring now in greater detail to FIG. 1, there is shown a communications switching and processing system connected to a plurality of communications channel input-output line pairs, designated C with numbered subscripts. The number of channel line pairs may be any number required by the application, and may be a number such as 250, which is the number of communications channels serviced by the illustrative system described herein. Each of the channel line pairs C is connected to an individual bit buffer BB having a correspondingly numbered subscript.

Each bit buffer BB includes a flip-flop for storing one information bit received from the respective two-way communications channel, and another flip-flop for storing one information bit until it is supplied to the communications channel. Each bit buffer BB also includes means for decoding its own address when the address is supplied over channel selection lines 64 to all of the bit buffers BB.

The bit buffers BB are energized one at a time in a particular sequence, and when energized, they are each capable of supplying one information bit over the line 10 to a buffer system 6, and receiving one information bit over line 36 from the buffer system 6. The buffer system 6, which is shown in detail in FIG. 2, acts to accumulate bits from each bit buffer BB into a character in a corresponding channel word location in a high speed memory, and acts to distribute an information character from the channel word location in the memory, one bit at a time, to the corresponding bit buffer BB.

The buffering system 6 supplies assembled information characters over lines 24, one character at a time, to a communications processing computer equipment 7, and receives one information character at a time over lines 40 from the equipment 7. The operation of the system 6 and the equipment 7 is coordinated by control signals over lines 27 and 86. The communications processing computer equipment 7 performs many functions, such as, assemblying message characters into message blocks and complete messages, code conversion, determining message priority, redirecting the message to another destination, calculating billing charges, etc.

DESCRIPTION OF BIT BUFFERING SYSTEM

Figure 2:
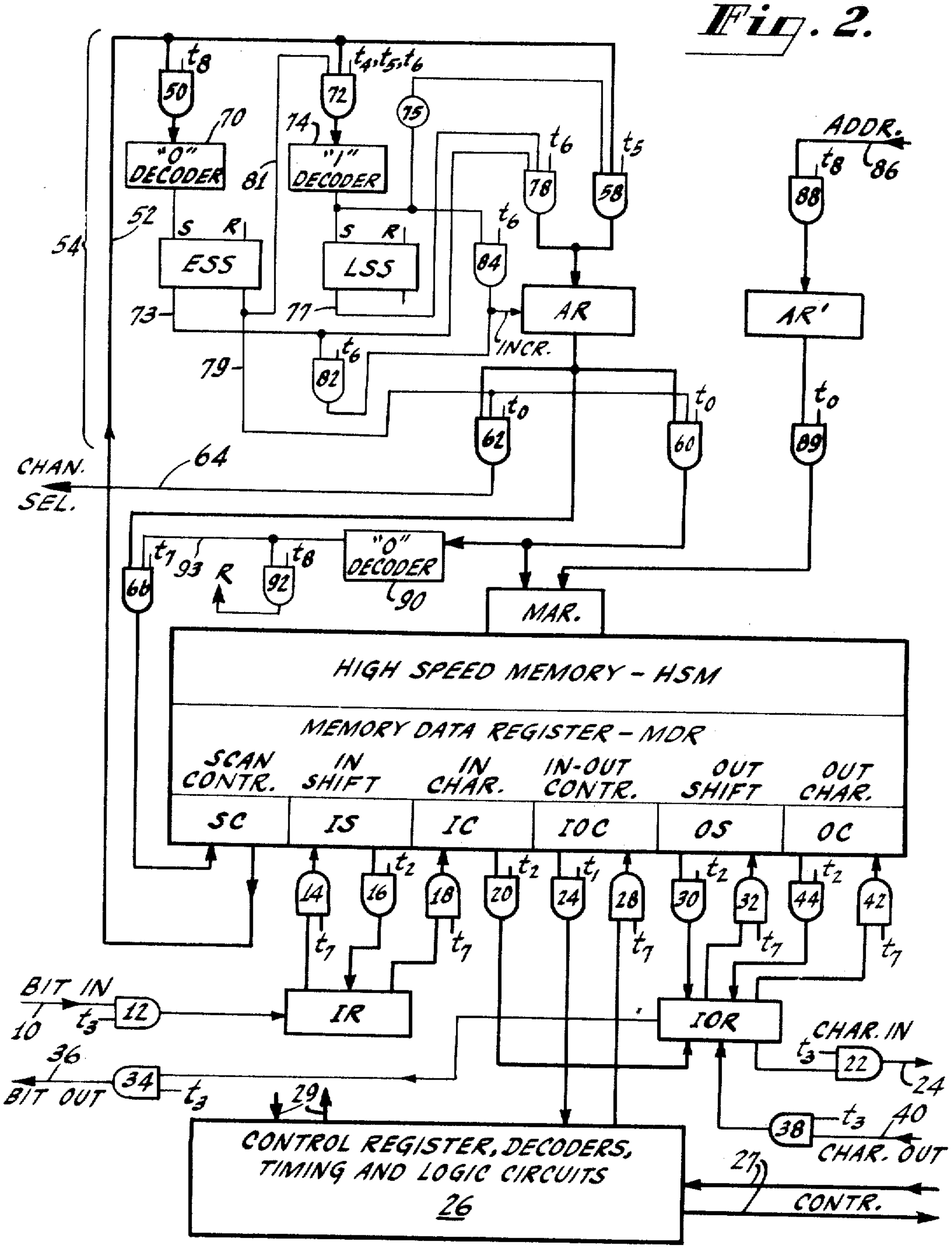
FIG. 2 is a diagram of the buffer system shown as a single block in FIG. 1.

Reference is now made to FIG. 2 for a description in greater detail of the buffer system illustrated by the box 6 in FIG. 1. The system of FIG. 2 is connected on its left side to the bit buffers BB (FIG. 1) of a large number of input-output communications channels, and is connected on its right side to the communications data processing equipment 7 (FIG. 1). The system of FIG. 2 functions as a buffer or interface between a large number of communications channels each handling information one bit at a time, and a communications data processing equipment receiving and supplying information in units of one character at a time.

The system of FIG. 2 includes a high speed memory HSM having a memory address register MAR for addressing channel word locations in the memory. The memory HSM contains as many word locations as there are input-output channels to be serviced. When a communication channel is to be serviced, the corresponding channel word stored in memory HSM is read out into the memory data register MDR. Each channel word stored in memory HSM, and the memory data register MDR, are divided into six respective portions for the performance of six respective functions.

The memory data register MDR includes a scan control register SC for containing information used in determining the next channel to be serviced. An input shift register IS is used for collecting incoming information bits one at a time until a complete character is accumulated. An input character register IC is used for temporarily storing a complete character that has previously been accumulated in the input shift register IS. An input-output signal control register IOC is used for containing information concerning the procedures to be followed in handling the information from or to the respective channel, and for containing information regarding the status of the respective channel. An output shift register OS is used for the distribution, one bit at a time, of an outgoing character. Finally, an output character register OC is used for the temporary storage of an outgoing information character prior to being transferred to the output shift register OS for distribution one bit at a time. The registers IS, IC, OS and OC, taken together, may be considered to be a bit collecting and distributing register.

In the system as illustrated in FIG. 2, all of the heavily-drawn signal lines are multiple-conductor lines for conveying several bits of information in parallel. Similarly, the heavily-drawn gates represent a plurality of gates connected in parallel. On the other hand, the lightly-drawn lines and gates represent individual lines and gates for handling individual information bits or control signals. All of the components illustrated are well-known and commonly-used computer elements.

A bit input line 10 from all input bit buffers BB (FIG. 1) is connected through a gate 12 to the bit input terminal of an input register IR capable of storing a complete character. A character may, for example, consist of nine binary bits. All of the bit locations in input register IR may be connected through gates 14 to corresponding bit locations in the input shift register IS of the memory data register MDR. Likewise, the character in the input shift register IS may be transferred through gates 16 to the input register IR. However, the wiring connections between the two storage locations are arranged to cause a one bit shift to the right every time a transfer is made from the input register IR to the input shift register IS. Once a complete character is accumulated in the input register IR, it is transferred through a gate 18 to the input character register IC. A character contained in the input character register IC may be transferred through a gate 20 to an input-output register IOR, and may in turn be transferred therefrom through a gate 22 to a character input line 24 for delivery to the communications handling equipment 7 of FIG. 1.

The input-output control register IOC of memory data register MDR is connected through gates 24 to control registers, decoders, timing and logic circuits 26. Updating of control information is performed by signals from the circuits 26 applied through gates 28 back to the input-output control register IOC. The circuits 26 are connected by lines 27 with the communications equipment 7 and by lines 29 with substantially all of the gates and logic elements shown in FIG. 2.

The output shift register OS of memory data register MDR is connected through gates 30 to the input-output register IOR, and the register IOR is in turn connected through gates 32 back to the output shift portion OS. The gates 30 and 32 are connected between the registers in such a way as to cause a one bit shift to the left every time the contents of the input-output register IOR is directed through gates 32 to the output shift register OS. The left-most bit in register IOR is directed through a gate 34 to a bit output line 36 connected to all of the output channel bit buffers BB.

The input-output register IOR is connected to receive a complete character through gates 38 from the communications equipment 7 over line 40. A character thus received in register IOR can be directed through gates 42 to the output character register OC, and may in turn be transferred through gates 44 back to the input-output register IOR and thence through gates 32 to the output shift register OS.

DESCRIPTION OF SCAN CONTROL CIRCUITS

The scan control register portion SC of the memory data register MDR is connected through lines 52 to an address register means 54. The lines 52 are connected through gates 58 to an address register AR. The address register AR is connected through gates 60 to the memory address register MAR of the high speed memory HSM. The address register AR is also connected through gates 62 and lines 64 to the channel selection inputs of all channel bit buffers BB (FIG. 1) associated with the respective communications channels. Additionally, the address register AR is connected through gates 66 and lines 68 back to the scan control register portion SC of the memory data register MDR.

The lines 52 from the scan control register SC are also connected through gates 50 to a "0" decoder 70; and lines 52 are additionally connected through gates 72 to a "1" decoder 74. The output of the "0" decoder 70 is connected to the set input S of an end of subscan flip-flop ESS. The output of the "1" decoder 74 is connected to the set input S of a last subscan flip-flop LSS, and through an inverter 75 to the gates 58. Set outputs 73 and 77 of respecive flip-flops ESS and LSS are connected to inputs of a gate 78. The reset output 79 of flip-flops ESS is connected to inputs of gates 62 and 60, and is connected over line 81 to the input of gates 72. The set output 73 of flip-flop ESS is connected through a gate 82 to an incrementing input terminal of address register AR. The output of the "1" decoder 74 is connected through a gate 84 to the incrementing input terminal of address register AR.

A second "0" decoder 90 is connected to receive addresses which are also supplied from gates 60 to the memory address register MAR. The output of decoder 90 is connected to a gate 92, which has an output R connected over lines not shown to the reset inputs R of the flip-flop ESS and LSS. The output of decoder 90 is also connected to an input of gates 66.

Lines 86 from the communications equipment 7 (FIG. 1) are provided to convey addresses through gates 88 to an address register AR′, and thence through gates 89 to the memory address register MAR.

DESCRIPTION OF ILLUSTRATIVE CHANNEL SERVICING SEQUENCE

FIGS. 4A and 4B, taken together, provide an illustration of the sequence in which the system of FIG. 2 can sequentially service two hundred and fifty bit-serial input-output channels having four different operating speeds. The left hand column B in FIG. 4A identifies the channels which operate at speeds of 75 bauds, 150 bauds, 1200 bauds and 2400 bauds. The next column SEQ shows the sequence of servicing the forty-five channels in each of the subscan cycles which are identified as 1 through 32 along the top of the chart.

The body of the chart contains the numbers of the channels 000 through 249 and shows the sequence in which they are serviced. For example, during the first subscan, the channels serviced are 001, 033, 065, 097, and so on down through channel 249 and finally channel 000. During the second subscan, the channels serviced are 002, 034, 066 down through 224, and then the same channels 225 through 000 as are listed for the first subscan. During the third subscan the channels serviced are 003, 035, 067, 099, 132, 164, 180, 195 and then the same channels 202 through 000 as are shown for the first subscan. The channels serviced during the fourth subscan are channels 004, 036, down through 181, and then the same channels 213 through 000 as are serviced during the second subscan. To summarize, channel numbers omitted from odd numbered subscans are the same as the corresponding channel numbers listed in subscan 1, and channel numbers omitted from even numbered subscans are the same as the corresponding channel numbers in subscan 2.

The distribution of the channel numbers in the sequence chart of FIGS. 4A and 4B is such that the highest speed channels operating at 2400 bauds are serviced once during each and every one of the thirty-two subscans. The intermediate speed channels operating at 1200 bauds are serviced once during every other one of the thirty-two subscans. The slowest speed channels, which are numbered 001 through 163 are each serviced only once during a complete scan including all of the thirty-two subscans.

In the present example, there are twenty-six highest speed channels operating at 2400 bauds. These twenty-six channels are assigned addresses 225 through 249 and 000, and they are serviced once during each and every one of the thirty-two subscans. The number of subscans is determined by the ratio of the speed of the highest speed channels (2400 bauds) to the speed of the slowest speed channels (75 bauds). This ratio, which gives thirty-two subscans, provides for the service of each of the slowest speed channels 001 through 164 once during every complete scan including all thirty-two subscans. The intermediate speed channels are fitted into the chart so that they are serviced an intermediate number of times during every complete scan.

The chart of FIGS. 4A and 4B shows the servicing sequence in a specific application where it was desired to service 250 channels including four groups of channels each operating at one of four different speeds. A similar chart can be made for any particular application having any number of channels operating at any number of different speeds. For every application, a chart is made following the scheme illustrated by designing a number of subscans each including all of the highest speed channels. The number of subscans is determined by the ratio of the speeds of the highest and lowest speed channels. Each slowest speed channel is made to appear in only one of the subscans. The intermediate speed channels are made to appear in an intermediate number of the subscans.

In utilizing the equipment of FIG. 2 for performing the sequential scanning of channels as illustrated in FIGS. 4A and 4B, the 250 channel words stored in memory HSM include a scan control portion SC which provides information for determining the next channel word to be accessed for the service of the corresponding channel. For example, the channel word whose address is 001 contains a scan control portion consisting of the number 033 for the subsequent service of channel 033. Likewise, the channel word whose address is 033 includes a scan control portion consisting of the number 065 for addressing the next channel 065 to be serviced. In other words, each channel word having an address shown in FIGS. 4A and 4B contains a scan control portion giving the channel number beneath it in the subscan of the next channel to be serviced.

However, the last channel word of all subscans, namely channel 000, includes a scan control portion which is varied by logic in order to make the transitions from the end of one subscan to the beginning of the next subscan. Also, the scan control portion SC of one channel word in the last or thirty-second subscan (channel 128) is a unique number (001) which is decoded and subsequently used to cause a transition from the last channel (channel 000) of the last subscan (subscan 32) to the first channel (channel 001) of the first subscan (subscan 1). The scan control portion of each word contains only the number of bits needed to identify the 250 channels. There are no extra bits in the scan control portion for controlling the scan sequence, and no counter is required to keep track of the subscans.

OPERATION IN SERVICING A CHANNEL

The operation of the system of FIG. 2 in sequentially servicing one of a large number of bit serial input-output channels will now be described. The timing sequence of events during one input-output bit service will be described in terms of the successive times $t_0$ through $t_8$ shown in FIG. 3. At time $t_0$, the address of a channel word is supplied by address register AR through gates 62 and over lines 64 to the bit buffers BB (FIG. 1) to select the corresponding channel, and the same address is supplied through gate 60 to the memory address register MAR to read the corresponding channel word from memory HSM into the memory register MDR. The various portions of the accessed channel word then appear in the corresponding portions of the register MDR.

For the purpose of simplifying the description of the invention, the memory HSM is described as one having a memory data register MDR into which an accessed channel word is read from memory at time $t_0$, and in which the accessed channel word remains until it is rewritten back into its channel word location at time $t_8$. Further, the memory data register is one in which the contents of the register may be replaced at any time in the interval between $t_0$ and $t_8$ by modified or different information. It will be understood that, if a memory employed is of the type requiring a read-regenerate read cycle and a read-regenerate write cycle, certain evident changes will be required in the timing relationships described.

At time $t_1$, the input and output control information contained in the channel word is transferred from the input-output register IOC through gates 24 to the control and logic circuits 26. The circuits 26 supply control signals as needed over lines 29 to all elements of the system.

At time $t_2$, the contents of the input shift register IS is supplied through gates 16 to the input register IR. Also, at time $t_2$, a partial character in output shift register OS is transferred through gates 30 to the input-output register IOR. However, if output shift register OS is empty, a complete character stored in output character register OC is transferred through gates 44 to the input-output register IOR.

At time $t_3$, one information bit from the selected channel is directed through gate 12 to the bit input end of input register IR. Also, at time $t_3$, the gate 34 is enabled to transfer one bit from the input-output register IOR to the bit output line 36 by which it is conveyed to the one selected channel.

At time $t_7$, the bits of an incomplete character present in input register IR, including the bit just received, are transferred through gates 14, with a one bit shift to the right, to the input shift portion IS. However, if a complete character is present in input register IR, the complete character is transferred through gates 18 to the input character register IC. Also, at time $t_7$, the contents of the input-output register IOR is transferred through gates 32 to the output shift register OS. At the same time, $t_7$, the control circuits 26 return updated information through gates 28 to the input-output control register IOC to reflect the changed status of the channel which has been serviced.

During the time period $t_5$ through $t_7$ the contents of the scan control portion of the accessed channel word is utilized to derive or generate the address of the next channel to be serviced. After this is accomplished, and after the scan control register SC has been updated, at time $t_8$, the entire contents of the memory data register MDR is written back into the same channel word location that it occupied before being read out. The operation of the system in deriving or generating the address of the next channel to be serviced will be described as occurring during the interval $t_5$ through $t_7$ following the interval $t_0$ through $t_4$ during which the accessed channel is serviced. This is done to facilitate an understanding of the operation of the system. However, it will be understood that the performance of deriving or generating the address of the next channel to be serviced may be performed during the same interval in which the channel is serviced, or during an overlapping interval.

GENERATION OF NEXT CHANNEL ADDRESS

Thus far, a description has been given of the operation of the system during channel service period in receiving one bit of information from one channel bit buffer BB and sending one bit of information to the same bit buffer BB. A description will now be given of the operation of the system, during the same channel service period, in deriving or generating the address of the next channel to be serviced.

Each channel word in memory includes a scan control portion giving the address of the next following channel in the subscan as shown in the chart of FIGS. 4A and 4B. Each channel word having an address given by the number in the body of the chart includes the address given by the number immediately beneath it. At the time $t_0$ of the same channel service period that has already been described in part, the accessed channel word read into the memory data register MDR includes the scan control portion read into the scan control register SC.

*Operation when the scan control portion of the channel being serviced is not 000 or 001*

At time $t_5$, the address constituting the contents of the scan control register SC in the memory data register MDR is supplied over lines 52 and gates 58 to the address register AR. (Since the address is not 001, the unenergized decoder 74 output after inversion in inverter 75 enables the gates 58.) The address register AR then contains the address of the next channel to be serviced in the same subscan group. The contents of register AR is utilized during time $t_0$ of the next following bit service cycle of operation.

*Operation when the scan control portion of the channel being serviced is the penultimate channel 249 of a subscan*

If the channel word being accessed is the penultimate channel word in a subscan, the channel being serviced is always channel number 249 in the chart of FIGS. 4A and 4B. The channel word for channel 249 contains a scan control portion giving the address 000, which is the address of the last channel serviced in each and every subscan. During the service of channel 249, the 000 contained in the scan control portion of the word is supplied over lines 52 and through gates 50 at time $t_8$ to the "0" decoder 70 which recognized the 000 address and sets the end of subscan flip-flop ESS. As long as the flip-flop ESS remains set, its reset output 79 is unenergized and is unable to act to enable gates 62 and 60. Therefore, gates 62 and 60 are blocked so long as flip-flop ESS is set. Consequently, during the following cycle, at time $t_0$, only 0's are supplied to the memory address register MAR regardless of the contents of register AR, and the effective address supplied to the memory is the address 000 for the last channel 000 of the subscan.

*Operation when the ultimate channel 000 of a subscan is serviced*

When the next channel, channel 000, is addressed and accessed, the channel 000 channel word in the memory data register MDR includes in the scan control portion thereof a channel address which is one of the addresses of channels 001 through 032. If the address is 001, which is the case when channel 000 is serviced during the first subscan, this address is not decoded by the "1" decoder 74 because the gate 72 is disabled by the absence of a reset output over line 81 from the set flip-flop ESS. Therefore, the next-channel address, which may be any number between 001 and 032 depending on the subscan, is directed at time $t_5$ through the gates 58 to the address register AR. The address supplied to register AR is then incremented by 1 at time $t_6$ by reason of the energization of the gate 82 having an input responsive to the set state of flip-flop ESS. The incremented address in register AR is applied at time $t_7$ through gate 66 to the SC portion of the memory data register MDR and thence back into the 000 memory word location in high speed memory HSM. (The gate 66 is enabled solely during service of the 000 channel by an output over line 93 from the "0" decoder 90.) The incremented address also remains in register AR for use at time $t_0$ of the next following bit service period for addressing the first channel of the next following subscan. Thereafter, all the channels of the next subscan are sequentially addressed and serviced.

After the end of the service period of channel 000, at time $t_8$, the end of subscan flip-flop ESS is always reset by an input to its reset terminal R from the "0" decoder 90 and the gate 92. The last subscan flip-flop LSS is also always reset at this time although the resetting of the flip-flop is actually needed only after the end of the servicing of the last channel 000 of the last or thirty-second subscan.

*Operation during service of the forty-five channels in the last subscan*

A special situation exists at the end of the last or thirty-second subscan requiring a shift from the servicing of the last channel in the last subscan to a servicing of the first channel in the first subscan. This is accomplished, in the present example, by the channel word for the channel 128 which includes a scan control portion containing the address 001. When the word whose address is 128 is accessed, the 001 in the scan control register SC is directed at times $t_4$, $t_5$ and $t_6$ through gate 72 to the "1" decoder 74. (The gate 72 is enabled by a signal on reset output line 81 since the flip-flop ESS is not set.) The decoder 74 recognizes the 001 and causes the last subscan flip-flop LSS to be set. The output of "1" decoder 74 and the inverter 75 disable gate 58 and prevent the 001 address from reaching the address register AR. The output of the "1" decoder 74 also acts through gate 84 at time $t_6$ to increment by 1 the address, 128, still in the address register AR. Thus the incremented address in register AR is 129, the address to be used for the next following service cycle in the same last subscan group.

The servicing of the remaining ones of the channels 129, 177, 193, etc., in the last or thirty-second subscan then proceeds in the previously-described manner until the penultimate channel number 249 is reached for service. During this time, flip-flop LSS has remained set. When channel 249 is accessed, the scan control portion of the word is 000 and the address is applied over lines 52 and through gates 50 at time $t_8$ to the "0" decoder 70 where it is decoded to cause the setting of the end of subscan flip-flop ESS in the manner that has previously been described. Since flip-flop ESS is set, it blocks a transfer of information through gates 62 and 60. Therefore, the address at the outputs of gates 62 and 60 which are supplied to the channel selection lines 64 and to the memory address register MAR during $t_0$ of the next service cycle is an address not containing any "1" bits. In other words, the address is the address 000 of the 000 channel.

When the last channel 000 of the last or thirty-second subscan is accessed, the channel word in the memory data register MDR includes the number 032 in the scan control portion thereof. The address 032 is the first channel of the last or thirty-second subscan which has already been serviced. Therefore the address 032 must be changed to the address 001 of the first channel of the first subscan. This is accomplished by utilizing the outputs of the end of subscan flip-flop ESS and the last subscan flip-flop LSS, which have both been set. The set outputs 73 and 77 of flip-flop ESS and LSS enable the gate 78 at time $t_6$ to force the address 001 into the address register AR. The output wiring of gate 78 is arranged to set the last stage of register AR to the "1" state and to reset all of the other stages of the address register AR to the "0" state. The forcing of the 001 into register AR follows and wipes out the undesired contents of register AR including the contents resulting from an incrementing of register AR by gate 84. The address 001 in register AR is applied at time $t_7$ through gate 66 to the SC portion of the MDR and thence into the memory word location in HSM. (The gate 66 is enabled during service of the 000 channel by an output over line 93 from the "0" decoder 90.) After this is accomplished, the flip-flops ESS and LSS are reset at time $t_8$, as usual. The address 001 remains in register AR for use as the address of the first channel of the first subscan. The system is then in condition to proceed with the sequential servicing of the channels in the first subscan, and so on, as has been described.

OPERATION DURING CHARACTER OUTPUT CYCLE

Figure 3:
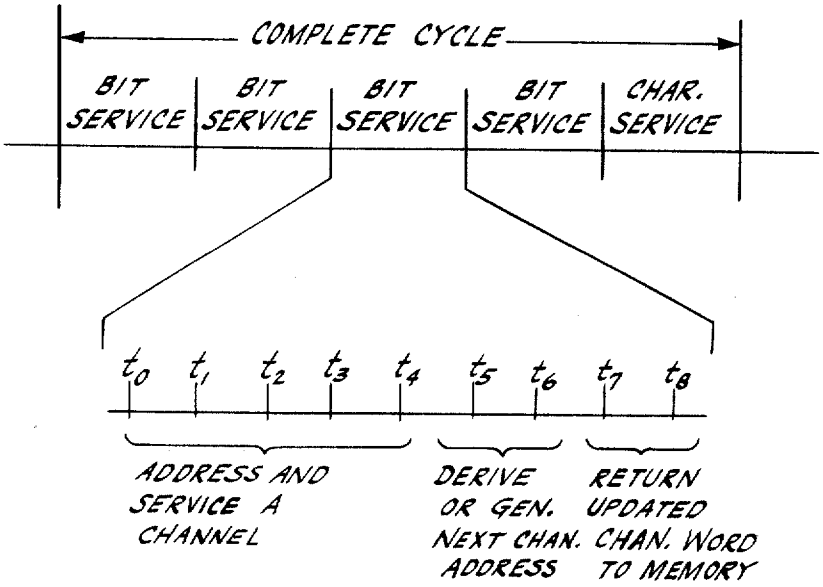
FIG. 3 is a timing chart which will be referred to in describing the operation of the system of FIG. 2.

The operation of the system of FIG. 2 in transferring information bits from and to the bit buffers BB (FIG. 1) has been described. Each such transfer is designated as one bit service period in the time chart of FIG. 3. During one complete and repeated cycle of operation of the system of FIG. 2, four communications channels are serviced in sequence, as shown in FIG. 3. Then, time is allocated for the transfer of an outgoing character from the equipment 7 (FIG. 1) to the buffer system of FIG. 2. The time allocated for this character transfer is designated Character Service in the time chart of FIG. 3. Timing pulses $t_0$ through $t_8$ are also employed during this character service.

At time $t_8$, a channel word address is supplied from the communications equipment 7 over line 86 and through gates 88 to the address register AR′. The address is then stored in the address register AR′ for use during the following character service interval of the next complete cycle of operation. At time $t_0$ of the next cycle, the address in register AR′ is directed through gates 89 to the memory address register MAR to cause the addressed channel word to be read from the memory HSM into the memory data register MDR.

At time $t_3$, an outgoing character from equipment 7 is supplied over line 40 and through gates 38 to the input-output register IOR. At time $t_7$, the character stored in input-output register IOR is passed through gates 42 to the output character register OC of the memory data register MDR. Then, following time $t_7$, the entire contents of the memory data register MDR is written back into the same memory word location. During a following bit service period for the same channel, as has been described, the outgoing character in register OC is transferred through gates 44 to the input-output register IOR and then through gates 32 to the output shift register OS. Later, the character in output shift register OS is repeatedly returned to the input-output register IOR, during successive bit service periods, to effect a distribution of the character, one bit at a time, from the input-output register IOR through gate 34 and line 36 to the bit buffers BB. It is thus seen that the input-output register IOR is used, in time sharing fashion, both during bit service periods and during character service periods.

The buffering system described is one which performs its function with a relatively small amount of hardware. The system utilizes the hardware very efficiently in the sense that the idle time vs. active time ratios of all portions of the hardware are low. Further, the system is one which is very flexible in its application to various and changeable communications requirements in that it is easily adapted to service any desired number of communications channels having any mix of different operating speeds. In applying the system to any particular communications requirement, one may prepare a chart following the principles of the chart of FIGS. 4A and 4B. Then the channel words stored in the memory HSM are made to contain scan control portions providing the next channel addresses in accordance with the chart.

The scan control hardware circuitry required is simple, as shown, when the chart is prepared using the address 000 for a highest speed channel serviced at the end of each subscan. The only additional significant limitation on the order in which channel addresses occur in the chart is that one of the channel words for one slowest speed channel in the last subscan (channel 128 in the example) should be unique in having a unique scan control portion constituted by a simple number such as 001, and that this channel 128 should be followed by a channel 129 whose address is one number higher. The described scheme permits the use of a high speed memory having only a number of word locations equal to the number of channels serviced. The space allocated in each channel word for the scan control portion need contain only the number of bits necessary to identify the addresses of the number of channels serviced. There is no need to allocate memory space for the purpose of controlling the different frequencies at which the individual channels are serviced.

What is claimed is:

1. Means for assembling information characters from a plurality of bit-serial information channels, comprising a memory having addresses each corresponding with one channel and one associated channel word location in said memory, each of said channel word locations including a scan control portion, a signal control portion and a bit collecting portion, the contents of the scan control portion of each word location containing the address of the next channel, and means responsive to the scan control portions of the word locations for sequentially addressing channels and corresponding channel word locations to cause a transfer during each access of an information bit from the addressed channel to the bit collecting portion of the addressed channel word location.

2. Means coupled to a plurality of a bit-serial input-output information channels, comprising a memory having addresses each corresponding with one channel and one associated channel word location in said memory, each of said channel word locations including a scan control portion, a signal control portion and a bit collecting and distributing portion, the contents of the scan control portion of each word locating containing the address of the next channel, and means responsive to the scan control portions of the word locations for sequentially addressing input-output channels and corresponding channel word locations to cause a transfer during each access of an information bit in each of both directions between the addressed channel and the bit collecting and distributing portion of the addressed channel word location.

3. Means for assembling information characters from a plurality of bit-serial information channels having different operating speeds, comprising a memory having addresses each corresponding with one channel and one associated channel word location in said memory, each of said channel word locations including a scan control portion, a signal portion and a bit collecting portion, said channels being serviced sequentially in subscan groups each including all of the highest speed channels and some of the lower speed channels, the contents of the scan control portion of each word location containing the address of the next channel of the subscan group.

means including an address register for addressing channels and corresponding channel word locations to cause a transfer during each access of an information bit from the addressed channel to the bit collecting portion of the addressed channel word location, and address logic circuitry receptive to the contents of the scan control portion of an accessed channel word for accepting the address of the next channel of the subscan, for recognizing the address of the last highest speed channel in each subscan group and generating the address of the first channel in the next subscan, and for recognizing the last highest speed channel of the last subscan and generating the address of the first channel of the first subscan.

4. Means coupled to a plurality of bit-serial input-output information channels having different operating speeds, comprising a memory having addresses each corresponding with one channel and one associated channel word location in said memory, each of said channel word locations including a scan control portion, a signal control portion, a bit collecting portion, and a bit distributing portion, said input and output channels being serviced sequentially in subscan groups each including all of the highest speed channels and some of the lower speed channels, the contents of the scan control portion of each word location containing the address of the next channel of the subscan group, means including an address register for addressing channels and corresponding channel word locations to cause a transfer during each access of an information bit from the addressed channel to the bit collecting portion of the addressed channel word location, and from the bit distributing portion of the addressed channel word location to the addressed channel, and address logic circuitry receptive to the contents of the scan control portion of an accessed channel word for accepting the address of the next channel of the subscan, for recognizing the address of the last highest speed channel in each subscan group and generating the address of the first channel in the next subscan, and for recognizing the last highest speed channel of the last subscan and generating the address of the first channel of the first subscan.

5. A system for cyclically addressing all of many word locations in a memory at least once during a complete cycle, said word locations including most frequently accessed locations and least frequently accessed locations, said locations being divided for purposes of description into subscan groups each including all of the most frequently accessed locations and some of the less frequently accessed locations, each least frequently accessed location being included in only one of said subscan groups, each of said word locations including space for the storage of scan control information giving the address of the next word location in the same subscan, comprising means including an address register for addressing word locations, and address logic circuitry receptive to the contents of the scan control portion of an accessed word for accepting the address of the next word of the same subscan, for recognizing the address of the last word in each subscan group and generating the address of the first word in the next subscan, and for recognizing the last word of the last subscan and generating the address of the first word of the first subscan.

6. A buffer system for coupling to a plurality of bit-serial channels operating at a number of different speeds, comprising a memory having addresses each corresponding with one channel and one associated channel word location in said memory, each of said channel word locations including a scan control portion and a character portion, said channels being serviced sequentially in subscan groups each including all of the highest speed channels and some of the lower speed channels, the contents of the scan control portion of each word location containing the address of the next channel and corresponding channel word location of the same subscan group, means including an address register, an end of subscan flip-flop and a last subscan flip-flop for sequentially addressing channels and corresponding channel word locations, and for causing a transfer during each access of an information bit between the addressed channel and the character portion of the addressed channel word location, means operative during the access of a channel word for accepting the scan control portion thereof and storing it in said address register for use in addressing the next channel word in the same subscan, decoder means for recognizing the address of the last channel word included in all subscans and setting said end of subscan flip-flop, means responsive to the set condition of said end of subscan flip-flop for generating the address of the first channel word of the next subscan, decoder means for recognizing the address of a channel word in the last subscan and setting said last subscan flip-flop, and means responsive to the set states of both of said end of subscan flip-flop and said last subscan flip-flop for generating the address of the first channel word of the first subscan.

7. A system for cyclically addressing all of many word locations in a memory at least once during a complete cycle, said word locations including most frequently accessed locations and least frequently accessed locations, said locations being divided for purposes of description into subscan groups each including all of the most frequently accessed locations and some of the less frequently accessed locations, each least frequently accessed locations being included in only one of said subscan groups, each of said word locations including space for the storage of scan control information giving the address of the next word location in the same subscan, comprising means including an address register, an end of subscan flip-flop and a last subscan flip-flop for sequentially addressing the word locations, means operative during the access of a word for accepting the scan control portion thereof and storing it in said address register for use in addressing the next word in the same subscan, decoder means for recognizing the address of the last word included in all subscans and setting said end of subscan flip-flop, means responsive to the set condition of said end of subscan flip-flop for generating the address of the first word of the next subscan, decoder means for recognizing the address of a word in the last subscan and setting said last subscan flip-flop, and means responsive to the set states of both of said end of subscan flip-flop and said last subscan flip-flop for generating the address of the first word of the first subscan.

8. A buffer system for coupling to a plurality of bit-serial information channels operating at a number of different speeds, comprising a memory having addresses each corresponding with one channel and one associated channel word location in said memory, each of said channel word locations including a scan control portion and a character portion, said channels being serviced sequentially in subscan groups each including all of the highest speed channels and some of the lower speed channels, the contents of the scan control portion of each word location containing the address of the next channel and corresponding channel word location of the same subscan group, means including an address register, an end of subscan flip-flop and a last subscan flip-flop for sequentially addressing channels and corresponding channel word locations, and for causing a transfer during each access of an information bit between the addressed channel and the character portion of the addressed channel word location, means operative during the access of a channel word for accepting the scan control portion thereof and storing it in said address register for use in addressing the next channel word in the same subscan, decoder means operative during the access of the penultimate channel word included in all subscans for recognizing the scan control portion thereof, and setting said end of subscan flip-flop for use during the next access in directly addressing the last channel word included in all subscans, means responsive to the set condition of said end of subscan flip-flop and operative during the directly-addressed access of the last channel word included in all subscans for incrementing the scan control portion thereof in said address register for use during the next access in addressing the first channel word of the next subscan, decoder means operative during the access of a channel word appearing solely in the last subscan for recognizing the scan control portion thereof and setting said last subscan flip-flop, and means responsive to the set states of both of said end of subscan flip-flop and said last subscan flip-flop, and operative during the access of the last channel word of the last subscan to generate and store in said address register the address of the first channel word of the first subscan.

9. A buffer system for coupling to a plurality of bit buffers each associated with a bit-serial input-output channel, comprising a memory having addresses each corresponding with one channel bit buffer and one associated channel word location in said memory, each of said channel word locations including a scan control portion, a signal control portion and a bit collecting and distributing portion, said input and output channels being serviced sequentially in subscan groups each including all of the highest speed channels and some of the lower speed channels, the contents of the scan control portion of each word location containing the address of the next channel and corresponding channel word location of the same subscan group, means including an address register, an end of subscan flip-flop and a last subscan flip-flop for sequentially addressing channel bit buffers and corresponding channel word locations, and for causing a transfer during each access of one information bit in one direction and another information bit in the other direction between the addressed bit buffer and the bit collecting and distributing portion of the addressed channel word location, means operative during the access of a channel word for accepting the scan control portion thereof and storing it in said address register for use in addressing the next channel word in the same subscan, decoder means operative during the access of the penultimate channel word included in all subscans for recognizing the scan control portion thereof, and setting said end of subscan flip-flop for use during the next access in directly addressing the last channel word included in all subscans, means responsive to the set condition of said end of subscan flip-flop and operative during the directly-addressed access of the last channel word included in all subscans for incrementing the scan control portion thereof in said address register for use during the next access in addressing the first channel word of the next subscan, decoder means operative during the access of a channel word appearing solely in the last subscan for recognizing the scan control portion thereof and setting said last subscan flip-flop, and means responsive to the set states of both of said end of subscan flip-flop and said last subscan flip-flop, and operative during the access of the last channel word of the last subscan to generate and store in said address register the address of the first channel word of the first subscan.

10. A buffer system for coupling to a plurality of bit buffers each associated with a bit-serial input-output channel, comprising a memory having addresses each corresponding with one channel bit buffer and one associated channel word location in said memory, each of said channel word locations including a scan control portion, a signal control portion and a bit collecting and distributing portion, said input and output channels being serviced sequentially in subscan groups each including all of the highest speed channels and some of the lower speed channels, the contents of the scan control portion of each word location containing the address of the next channel and corresponding channel word location of the same subscan group, the contents of the scan portion of one channel word appearing once solely in the last subscan being unique, means including an address register, an end of subscan flip-flop and a last subscan flip-flop for sequentially addressing channel bit buffers and corresponding channel word locations, and for causing a transfer during each access of one information bit in one direction and another information bit in the other direction between the addressed bit buffer and the bit collecting and distributing portion of the addressed channel word location, means operative during the access of a channel word for accepting the scan control portion thereof and storing it in said address register for use in addressing the next channel word in the same subscan, decoder means operative during the access of the pneultimate channel word included in all subscans for recognizing the scan control portion thereof, and setting said end of subscan flip-flop for use during the next access in directly addressing the last channel word included in all subscans, means responsive to the set condition of said end of subscan flip-flop and operative during the directly-addressed access of the last channel word included in all subscans for incrementing the scan control portion thereof in said address register for use during the next access in addressing the first channel word of the next subscan, decoder means operative during the access of said one channel word appearing solely in the last subscan for recognizing the unique scan control portion thereof, setting said last subscan flip-flop, and incrementing the contents of said address register to provide the address therein of the next channel word to be accessed, means responsive to the set states of both of said end of subscan flip-flop and said last subscan flip-flop, and operative during the access of the last channel word of the last subscan to generate and store in said address register the address of the first channel word of the first subscan, and means operative during the access of the last channel word appearing in all subscans for resetting said end of subscan flip-flop and said last subscan flip-flop, whereby each highest speed channel is serviced once during each subscan, each slowest speed channel is serviced once during each complete scan, and each intermediate speed channel is serviced at an intermediate frequency.

11. A system for cyclically addressing all of many word locations in a memory at least once during a complete cycle, said word locations including most frequently accessed locations and least frequently accessed locations, said locations being divided for purposes of description into subscan groups each including all of the most frequently accessed locations and some of the less frequently accessed locations, each least frequently accessed location being included in only one of said subscan groups, each of said word locations including space for the storage of scan control information giving the address of the next word location in the same subscan, comprising means including an address register, an end of subscan flip-flop and a last subscan flip-flop for sequentially addressing the word locations, means operative during the access of a word for accepting the scan control portion thereof and storing it in said address register for use in addressing the next word in the same subscan, decoder means operative during the access of the penultimate word included in all subscans for recognizing the scan control portion thereof, and setting said end of subscan flip-flop for use during the next access in directly addressing the last word included in all subscans, means responsive to the set condition of said end of subscan flip-flop and operative during the directly-addressed access of the last word included in all subscans for incrementing the scan control portion thereof in said address register for use during the next access in addressing the first word of the next subscan, decoder means operative during the access of said one word appearing solely in the last subscan for recognizing the unique scan control portion thereof, setting said last subscan flip-flop, and incrementing the contents of said address register to provide the address therein of the next word to be accessed, means responsive to the set states of both of said end of subscan flip-flop and said last subscan flip-flop, and operative during the access of the last word of the last subscan to generate and store in said address register the address of the first word of the first subscan, and means operative during the access of the last word appearing in all subscans for resetting said end of subscan flip-flop and said last subscan flip-flop.

No references cited.

ROBERT C. BAILEY, *Primary Examiner.*

I. S. KAVRUKOV, *Assistant Examiner.*